(12) United States Patent
Kitagawa et al.

(10) Patent No.: US 8,438,848 B2
(45) Date of Patent: May 14, 2013

(54) ENGINE WITH TURBOCHARGER AND EGR

(75) Inventors: Takehide Kitagawa, Oyama (JP);
Yasukuni Kawashima, Oyama (JP);
Shuuji Hori, Oyama (JP); Daisuke Kozuka, Oyama (JP)

(73) Assignee: Komatsu Ltd., Tokyo (JP)

( * ) Notice: Subject to any disclaimer, the term of this patent is extended or adjusted under 35 U.S.C. 154(b) by 48 days.

(21) Appl. No.: 13/260,395

(22) PCT Filed: Mar. 23, 2010

(86) PCT No.: PCT/JP2010/054933
§ 371 (c)(1),
(2), (4) Date: Sep. 26, 2011

(87) PCT Pub. No.: WO2010/110243
PCT Pub. Date: Sep. 30, 2010

(65) Prior Publication Data
US 2012/0017588 A1    Jan. 26, 2012

(30) Foreign Application Priority Data

Mar. 26, 2009   (JP) ................................ 2009-077249

(51) Int. Cl.
*F02B 33/44*   (2006.01)
(52) U.S. Cl.
USPC .......................................... 60/605.2; 60/600

(58) Field of Classification Search ................. 60/605.2, 60/600
See application file for complete search history.

(56) References Cited

U.S. PATENT DOCUMENTS

| 8,109,090 B2 * | 2/2012 | Nishiyama et al. ............. 60/602 |
| 2012/0266595 A1 * | 10/2012 | Buschur et al. ................. 60/607 |

FOREIGN PATENT DOCUMENTS

| JP | 06058158 A * | 3/1994 |
| JP | 2008-133924 A | 6/2008 |
| WO | 2005/095834 A1 | 10/2005 |
| WO | 2008/053771 A1 | 5/2008 |

OTHER PUBLICATIONS

International Search Report mailed Jun. 15, 2010 from International Application No. PCT/JP2010/054933, 1 page.

* cited by examiner

*Primary Examiner* — Mary A Davis
(74) *Attorney, Agent, or Firm* — Fish & Richardson P.C.

(57) ABSTRACT

An engine includes a variable geometry turbocharger, an EGR valve device, a hydraulic servo drive device that drives the variable geometry turbocharger, a hydraulic servo drive device that drives the EGR valve device, an electronic proportional control valve (EPC valve) that supplies pilot pressure oil to the hydraulic servo drive device, and an electronic proportional control valve (EPC valve) that supplies pilot pressure oil to the hydraulic servo drive device, the EPC valves being attached to the EGR valve device.

5 Claims, 6 Drawing Sheets ure 1 but also an EGR valve device as disclosed in Patent Literature 2, the pressure oil from the main pump is temporarily directed into a hydraulic manifold block, and is divided therein into pressure oil for the variable geometry turbocharger and pressure oil for the EGR valve.

ENGINE WITH TURBOCHARGER AND EGR

CROSS REFERENCE TO RELATED APPLICATIONS

This application claims priority to Application No. PCT/JP2010/054933 filed on Mar. 23, 2010, which application claims priority to Japanese Application No. 2009-077249, filed on Mar. 26, 2009. The entire contents of the above applications are incorporated herein by reference in their entireties.

TECHNICAL FIELD

The present invention relates to an engine.

BACKGROUND ART

As a turbocharger mountable on a diesel engine, there has been conventionally known a variable geometry turbocharger having a nozzle through which exhaust gas is ejected and whose opening degree is adjustable. An opening degree adjustment mechanism for the nozzle is installed in the variable geometry turbocharger. It has been suggested to use a hydraulic actuator to actuate such an opening degree adjustment mechanism (e.g., Patent Literature 1).

Some diesel engines employ exhaust gas recirculation (hereinafter abbreviated as "EGR"), so that exhaust gas is partly returned back to the air-intake side in order to lower a combustion temperature to suppress emission of NOx. An arrangement for realizing EGR generally includes an EGR pipe that communicates an exhaust pipe and an intake pipe and an EGR valve device provided in the middle of the EGR pipe. It has also been suggested to use a hydraulic actuator to control the opening and closing of the EGR valve device (e.g., Patent Literature 2).

A hydraulic actuator for a variable geometry turbocharger or an EGR device uses pilot pressure generated by an electronic proportional control valve (hereinafter abbreviated as "EPC valve") to move a pilot spool to a position where the pilot spool is balanced with a spring that provides reaction force. The hydraulic actuator also uses pump pressure oil from a main pump (hereinafter referred to as "main pump pressure oil") to move a hydraulic piston following the pilot spool, thereby, in conjunction with the hydraulic piston, actuating the opening degree adjustment mechanism in the variable geometry turbocharger or controlling the operation of the EGR valve. Specifically, by adjusting an electric current provided to the EPC valve, it is possible to adjust the stop position of the spool movable with the pilot pressure corresponding to the electric current. With this arrangement, in case of the variable geometry turbocharger, the movement amount of the hydraulic piston and the resulting opening degree of the nozzle determined through the opening degree adjustment mechanism become controllable. In case of the EGR device, the opening degree of a poppet valve in an area through which exhaust gas passes becomes controllable.

Typically, when an engine is provided with not only a variable geometry turbocharger as disclosed in Patent Literature 1 but also an EGR valve device as disclosed in Patent Literature 2, the pressure oil from the main pump is temporarily directed into a hydraulic manifold block, and is divided therein into pressure oil for the variable geometry turbocharger and pressure oil for the EGR valve.

Since the temperature of the variable geometry turbocharger can become considerably high, a hydraulic actuator for the variable geometry turbocharger is attached to the variable geometry turbocharger. In contrast, the EPC valve, which is easily affected by heat, is attached not to the variable geometry turbocharger or the hydraulic actuator but to the hydraulic manifold block, which is located at a position free from the thermal influence of the variable geometry turbocharger. Since exhaust gas passes through the EGR valve device after being cooled by an EGR cooler, the temperature of a solenoid actuator for the EGR valve device does not become so high. Thus, the solenoid actuator is installed as a part of the EGR valve device.

Citation List
Patent Literature
    Patent Literature 1: WO 08/053771 A1
    Patent Literature 2: WO 05/095834 A1

SUMMARY OF THE INVENTION

Problems to be Solved by the Invention

In the above arrangement, the variable geometry turbocharger and the EGR valve are located at an upper portion of the engine. Thus, the hydraulic manifold block, which is made of metal and has a heavy weight, is likewise inevitably located at a relatively upper portion of the engine and is fixed to a cylinder head or the like. As a result, the centroid position of the engine becomes high, so that once the engine suffers a large vibration or rolling along with a vehicle body, it takes a while before the vibration or rolling subsides, which makes the engine unstable.

Further, since a pipe from the main pump, a pipe to the variable geometry turbocharger, a pipe to the EGR valve, a drain pipe, and the like are connected to the hydraulic manifold block, attaching pipes, nipples and the like is troublesome and the pipes are likely to be wrongly connected, which lowers assembly efficiency.

An object of the invention is to provide an engine, which has a reduced weight of a cylinder head component and the vicinity thereof to improve stability and is assembled with an excellent efficiency.

Means for Solving the Problems

According to an aspect of the invention, an engine includes: a variable geometry turbocharger; an EGR valve device; first and second hydraulic actuators that actuate the variable geometry turbocharger and the EGR valve device, respectively; and first and second control valves that generate pilot pressure for the first and second hydraulic actuators, respectively, in which one of the variable geometry turbocharger and the EGR valve device is attached with both the first and second control valves, and the one of the variable geometry turbocharger and the EGR valve device is located at a position different from an exhaust manifold side of the engine.

Attaching the first and second control valves to one of the devices includes not only directly attaching the first and second control valves to the one of the devices but also indirectly attaching the first and second control valves to the one of the devices via the hydraulic actuator.

In the engine, it is preferable that the EGR valve device includes: an internal passage for pump pressure oil through which pump pressure oil is supplied to the second hydraulic actuator; an internal branched passage for pump pressure oil that is branched from the internal passage for pump pressure oil to supply the pump pressure oil to the first hydraulic actuator; and a pair of internal branched passages for generating pilot pressure that is branched from the internal passage for pump pressure oil to supply the pump pressure oil to the first and second control valves.

In the engine, it is preferable that the first hydraulic actuator is provided with a drain port for the pump pressure oil, and the drain port is in communication with the variable geometry turbocharger.

In the engine, it is preferable that engine lubricating oil is used as the pressure oil supplied to the first and second hydraulic actuators.

The engine further includes: an engine lubrication path that lubricates the engine; a pressure oil supply path that is branched from the engine lubrication path to supply the engine lubricating oil to the first and second actuators; a hydraulic pump that is provided in the engine lubrication path to make the engine lubricating oil flow through the engine lubrication path; and a boost pump that is provided in the pressure oil supply path to boost a pressure of the engine lubricating oil from the hydraulic pump before the engine lubricating oil flows through the pressure oil supply path.

With the above arrangement, since both the first control valve for the first hydraulic actuator and the second control valve for the second hydraulic actuator are attached to the same device (either the variable geometry turbocharger or the EGR valve device), it is possible to directly supply the pump pressure oil to the device attached with these valves, to distribute a source pressure for generating pilot pressure to the first and second control valves through the device, and to supply the pump pressure oil to the first and second actuators through the device. Thus, a conventional hydraulic manifold block for distributing a pump pressure is unnecessary. Since the number of heavy components of the engine can be reduced, vibration or rolling can readily subside to provide an improved stability. Additionally, since a conventional hydraulic manifold block is unnecessary, an attaching work for attaching nipples and pipes thereto is also unnecessary. Thus, assembly efficiency can be improved.

As described above, when the device attached with the first and second control valves is located at a position that is different from the exhaust manifold side of the engine and is unlikely to be heated to a high temperature, the device is unlikely to be easily affected by the heat of the engine and thus reliability can be significantly improved.

Generally, the variable geometry turbocharger and the EGR valve device are intended to be attached to a high portion near the cylinder head of the engine. In view of this, the hydraulic manifold block, which is used along with the variable geometry turbocharger and the EGR valve, can also be removed from the high portion, thereby reliably lowering the centroid of the entire engine. Thus, stability can be further improved.

Since the various internal passages and internal branched passages are provided in the EGR valve device, an external pipe and the like are unnecessary to further improve assembly efficiency.

The drain port of the first hydraulic actuator provided to the variable geometry turbocharger is in communication with the variable geometry turbocharger, so that the pressure oil can be drained through the variable geometry turbocharger. Since a drain pipe originally provided to the variable geometry turbocharger can be used, a long pipe is not necessary to be attached.

In particular, when the first hydraulic actuator is firmly attached to the variable geometry turbocharger, the first hydraulic actuator and the variable geometry turbocharger can be in communication with each other without any drain pipe, which results in a reduction in the number of pipes.

When the engine lubricating oil is used as the pressure oil supplied to each of the first and second hydraulic actuators, no completely independent pressure oil supply path is required as long as the engine lubrication path is provided, so that the engine can become compact. Further, since it is unnecessary to separately prepare the pressure oil and the lubricating oil, the engine is excellent in maintenance efficiency.

Even though the hydraulic pump provided in the engine lubrication path cannot prevent a shortage of the hydraulic pressure, the boost pump provided in the pressure oil supply path serves to reliably ensure the hydraulic pressure. By using the boost pump in combination with the hydraulic pump provided for lubrication of the engine, no dedicated high-capacity pump is required to enable the pressure oil to flow through the pressure oil supply path, which also contributes to a reduction in the size of the engine.

DESCRIPTION OF THE EXEMPLARY EMBODIMENT

First of all, with reference to FIG. 1, description will be made below on an engine lubrication path 70 used in an engine 1 according to an exemplary embodiment of the invention.

Figure 1:
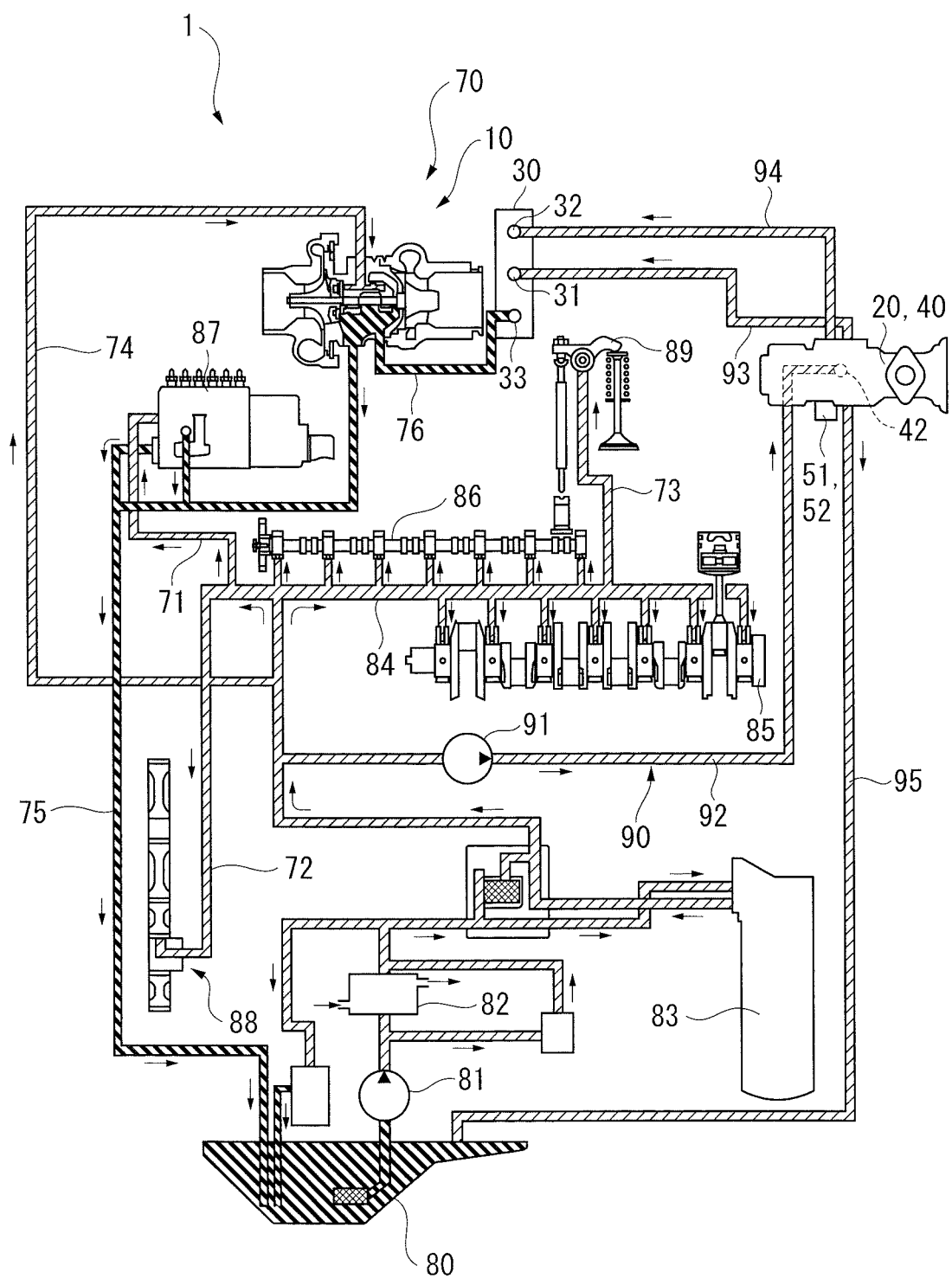
FIG. 1 shows an engine lubrication path applied to an engine according to an exemplary embodiment of the invention.

Referring to FIG. 1, in the lubrication path 70, lubricating oil in an oil pan 80 of the engine 1 is pumped up by a hydraulic pump 81 as a main pump and supplied to a main gallery 84 via an oil cooler 82 and an oil filter 83. The lubricating oil from the main gallery 84 mainly lubricates a crankshaft 85 and a camshaft 86.

The lubrication path 70 includes the following paths that are branched from the main gallery 84: an injector-side path 71 for lubricating a cam driver or the like in a fuel injector 87 such as a fuel supply pump; a transmission-mechanism-side path 72 for lubricating a power transmission mechanism 88 that includes a timing gear; a rocker-arm-side path 73 for lubricating a rocker arm 89; a turbocharger-side path 74 for lubricating a bearing that supports a turbo shaft of a variable geometry turbocharger 10; and a drain path 75 for returning the lubricating oil from the variable geometry turbocharger 10 and the fuel injector 87 to the oil pan 80.

In this exemplary embodiment, in addition to the lubrication path 70, a pressure oil supply path 90 through which a part of the lubricating oil is supplied as a driving pressure oil to a hydraulic servo drive device (first hydraulic actuator) 30 and a hydraulic servo drive device (second hydraulic actuator) 40 is provided. A drain passage 76 for supplying a drain pressure oil from the hydraulic servo drive device 30 into the variable geometry turbocharger 10 is also provided. The drain passage 76 merges into the drain path 75.

In other words, in this exemplary embodiment, a part of the engine lubricating oil is used as the pressure oil for driving the hydraulic servo drive devices 30 and 40 and the pressure oil supply path 90 branched before the main gallery 84 is used as a path for supplying the pressure oil. A boost pump 91 is provided near a starting end of the pressure oil supply path 90. The pressure oil whose pressure is raised is supplied to a pump port 42 of the hydraulic servo drive device 40 installed inside an EGR valve device 20 through a driving pressure path 92.

The driving pressure path 92 is branched through the inside of the EGR valve device 20 into a driving pressure path 93 and a pilot pressure path 94. The driving pressure path 93 is directed to a pump port 31 of the hydraulic servo drive device 30. Pilot pressure oil is supplied to a pilot port 32 of the hydraulic servo drive device 30 through the pilot pressure path 94.

The pilot pressure in the pilot pressure path 94 is generated by an EPC valve 51 (first control valve) attached to an outer surface of the EGR valve device 20. When a predetermined electric current is applied to the EPC valve 51, pilot pressure corresponding to the electric current is generated and a pilot spool 63 (FIG. 4) of the hydraulic servo drive device 30 is moved to a position corresponding to the pilot pressure. In this manner, the nozzle of the variable geometry turbocharger 10 is driven by the hydraulic servo drive device 30 to adjust the nozzle opening degree.

In contrast, the pilot pressure in the hydraulic servo drive device 40 installed inside the EGR valve device 20 is generated by another EPC valve 52 (second control valve) provided to the EGR valve device 20. In other words, the two EPC valves 51 and 52 are provided side by side to the EGR valve device 20. With pilot pressure oil from the EPC valve 52, a pilot spool 49 (FIG. 4) of the hydraulic servo drive device 40 can likewise be moved to a position corresponding to the pilot pressure. In this manner, a poppet valve 21 (FIG. 4) of the EGR valve device 20 is driven by the hydraulic servo drive device 40 to adjust the valve opening degree thereof.

Incidentally, a cooling water path (not shown) is also connected to the variable geometry turbocharger 10, so that the variable geometry turbocharger 10 is cooled by water passing through the cooling water path. Further, although FIG. 1 shows that a return-side end of the drain path 75 seems to be connected to the oil pan 80, the end is, in fact, connected to an engine body, so that the oil is returned to the oil pan 80 through the engine body.

Next, a detailed description will be made on the engine 1 and the pressure oil supply path 90 with reference to FIG. 2 and FIGS. 3A, 3B and 3C.

Figure 2:
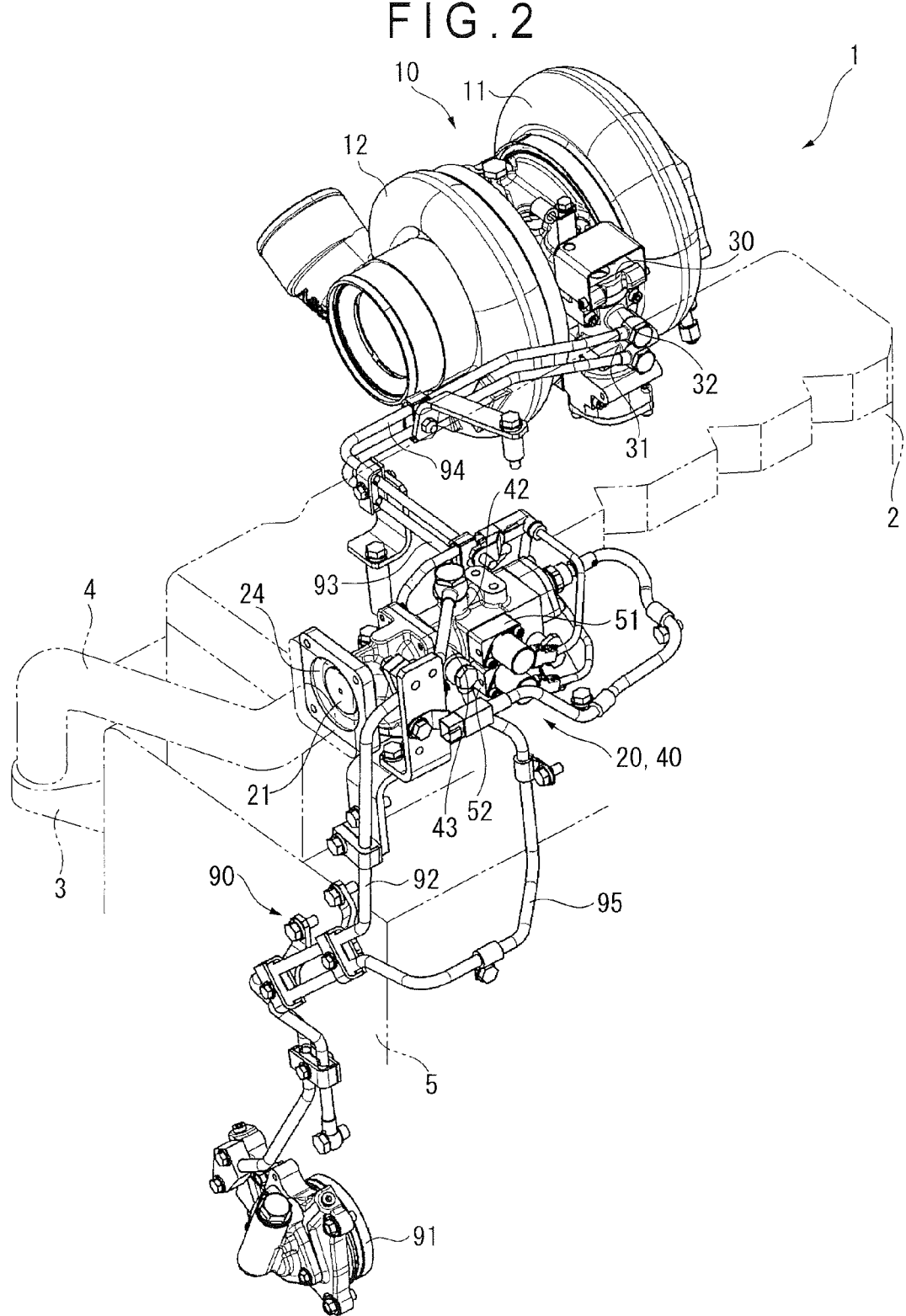
FIG. 2 is a perspective view showing a schematic structure of a pressure oil supply path provided to the engine.

Referring to FIG. 2, at an exhaust side of the engine 1 (i.e., a side at which an exhaust manifold and the like, not shown, are located), the variable geometry turbocharger 10 is provided at an upper position of a cylinder head 2. The variable geometry turbocharger 10 includes an exhaust gas turbine 11, a compressor 12 being driven by the exhaust gas turbine 11, and an opening degree adjustment mechanism that adjusts the opening degree of the exhaust gas turbine 11. Since such a specific configuration is known, a detailed description thereof is omitted herein. The variable geometry turbocharger 10 is attached with the hydraulic servo drive device 30 for driving the opening degree adjustment mechanism installed in the variable geometry turbocharger 10. An EGR cooler 3 is also located at the exhaust side of the engine 1.

The EGR cooler 3 is a heat exchanger that cools exhaust gas for EGR, and is attached relatively upstream of an EGR pipe 4, i.e., near the exhaust manifold. As cooling water used in the EGR cooler 3, cooling water for the engine 1 is used.

At an intake side of the engine 1 (i.e., a side at which an intake manifold and the like, not shown, are located), the EGR valve device 20 is likewise provided at an upper position of the cylinder head 2. The EGR valve device 20 is attached downstream of the EGR cooler 3, i.e., near the intake manifold. The EGR valve device 20 includes an exhaust gas introduction opening 24, an exhaust gas discharge opening 25 (FIG. 3B) and the poppet valve 21 that opens and closes the exhaust gas introduction opening 24.

Figure 3A:
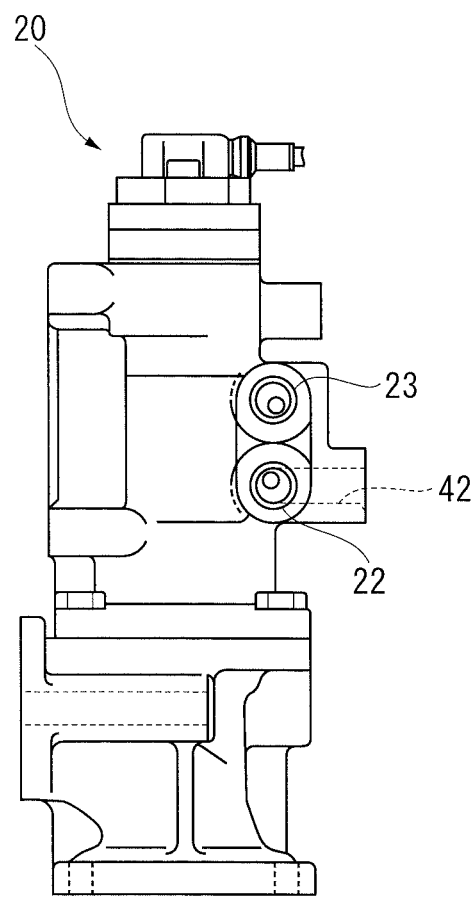
FIG. 3A is a left-side view showing a device used in the pressure oil supply path.
Figure 3B:
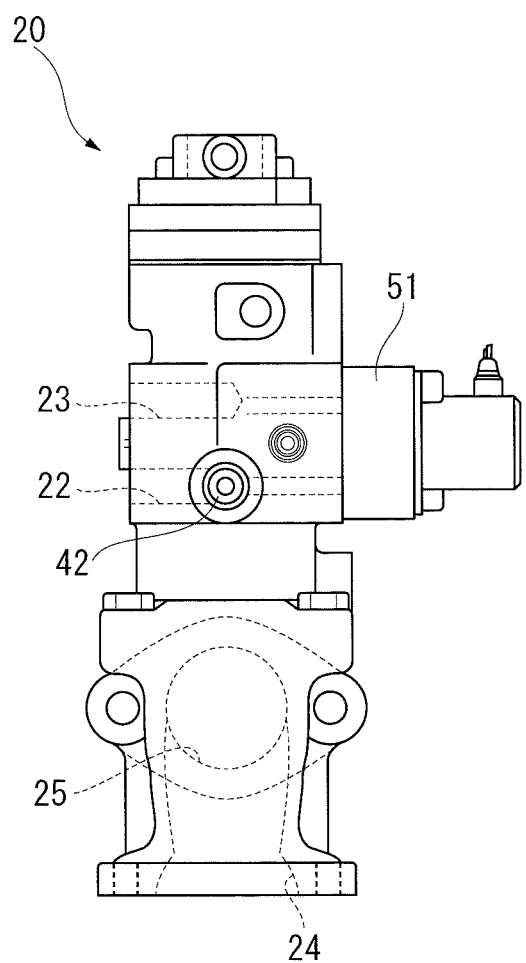
FIG. 3B is a front view showing the device used in the pressure oil supply path.
Figure 3C:
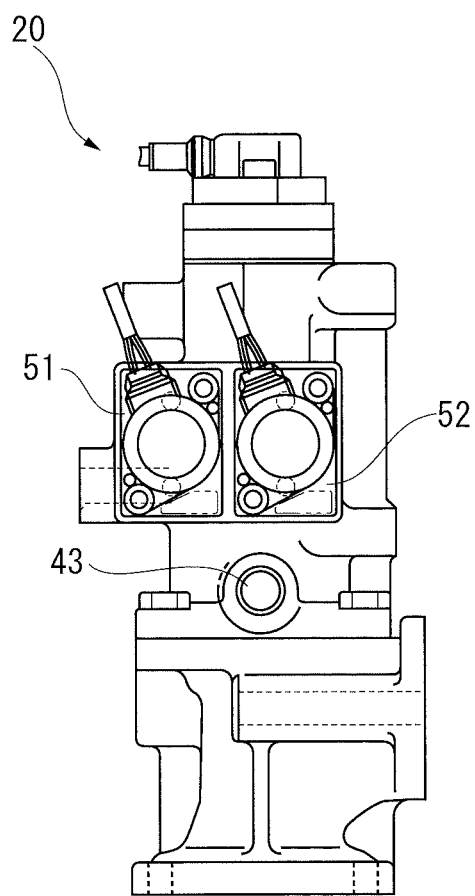
FIG. 3C is a right-side view showing the device used in the pressure oil supply path.

As also shown in FIG. 3C, the EPC valves 51 and 52 are provided side by side on a lateral surface of the EGR valve device 20, the EPC valve 51 generating pilot pressure to the hydraulic servo drive device 30 for the variable geometry turbocharger 10, the EPC valve 52 generating pilot pressure for the hydraulic servo drive device 40 installed inside the EGR valve device 20.

Since it is desirable that the EPC valves 51 and 52 should not be thermally affected, the EPC valves 51 and 52 are provided to the EGR valve device 20 located at the intake side in this exemplary embodiment. However, the EPC valves 51 and 52 are attachable to a device that is not located at the intake manifold side as long as the device is located at a position different from the exhaust manifold side, i.e., at a position with less thermal influence (e.g., near a front or rear end along the direction of the cylinder row of the engine 1).

At the intake side of the engine 1 shown in FIG. 2, the boost pump 91 of the pressure oil supply path 90 (also described with reference to FIG. 1), is provided to a lower portion of a cylinder block 5. The boost pump 91 and the pump port 42 (see also FIG. 3B) of the EGR valve device 20 (the hydraulic servo drive device 40) are mutually connected via a pipe for the driving pressure path 92 through which the main pump pressure oil is supplied.

The EGR valve device 20 is also provided with a drain port 43 (see also FIG. 3C) from which the pressure oil used in the hydraulic servo drive device 40 is drained. The drain port 43 and the lower portion of the cylinder block 5 are mutually connected via a pipe for a drain path 95. The drain pressure oil returned to the cylinder block 5 through the drain path 95 is eventually returned to the oil pan 80 (FIG. 1).

As shown in FIGS. 3A and 3B, the EGR valve device 20 is also provided with an output port 22 that is branched therein from a passage of the pump port 42. The output port 22 and the pump port 31 of the hydraulic servo drive device 30 for the variable geometry turbocharger 10 are mutually connected via a pipe for the driving pressure path 93. The EGR valve device 20 is also provided with an output port 23 for the pilot pressure oil from the EPC valve 51, the outlet port 23 being connected to the pilot port 32 of the hydraulic servo drive device 30 via a pipe for the pilot pressure path 94.

Figure 4:
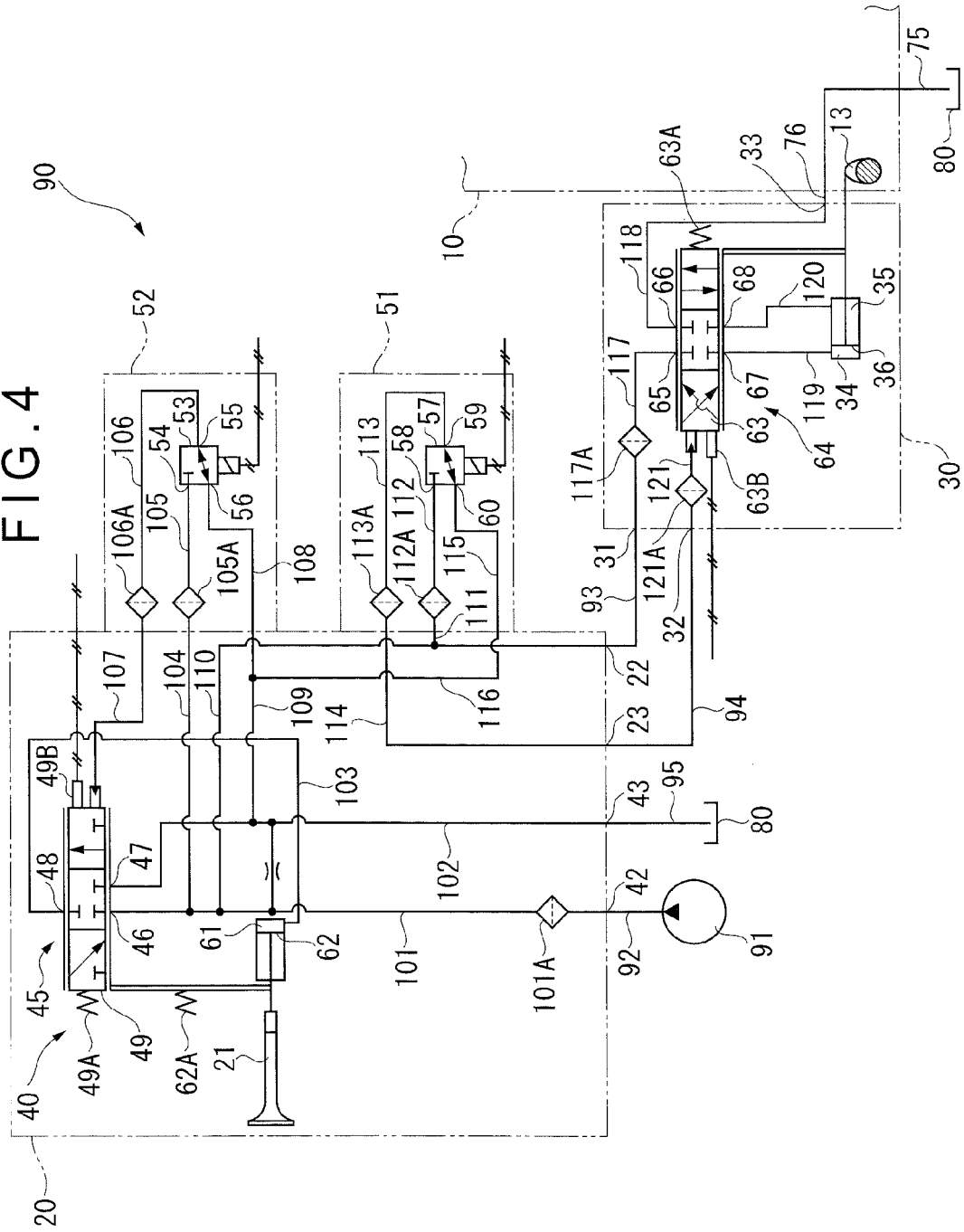
FIG. 4 is a hydraulic circuit diagram of a device connected to the pressure oil supply path.

FIG. 4 shows a further detailed hydraulic circuit diagram to illustrate the EGR valve device 20 connected to the pressure oil supply path 90 and the hydraulic servo drive devices 30 and 40. With reference to FIG. 4, the EGR valve device 20 and the hydraulic servo drive devices 30 and 40 are described in detail and the respective operations thereof are also described.

Referring to FIG. 4, the pressure oil from the boost pump 91 is supplied to the pump port 42 of the EGR valve device 20 through the driving pressure path 92. In the EGR valve device 20, the pump port 42 is in communication with a pressure oil inlet port 46 of a piston 45 via a first internal passage (an internal passage for pump pressure oil) 101, the piston 45 constituting the hydraulic servo drive device 40. The first internal passage 101 is provided with a filter 101A. A drain outlet port 47 of the piston 45 is in communication with the drain port 43 via a second internal passage 102. A pressure oil outlet port 48 of the piston 45 is in communication with a cylinder pressure oil chamber 61 in the hydraulic servo drive device 40 via a third internal passage 103.

The pilot spool 49 inside the piston 45 is driven with the pilot pressure oil from the EPC valve 52. The pilot spool 49 is provided with a position sensor 49B. Based on a position detection signal fed back from the position sensor 49B to a controller (not shown), the position of the pilot spool 49 is servo-controlled.

In the hydraulic servo drive device 40, when the pilot spool 49 is moved leftward in the figure with a pilot pressure larger than the spring force of a spring 49A, the first internal passage 101 and the third internal passage 103 are brought into communication with each other via the ports 46 and 48 during the movement of the pilot spool 49 to supply the cylinder pressure oil chamber 61 with the main pump pressure oil.

When the pressure oil is supplied to the cylinder pressure oil chamber 61, a hydraulic piston 62 is moved, so that the poppet valve 21, which is connected to the hydraulic piston 62, is driven to open. The hydraulic piston 62 is configured to move following the pilot spool 49 and, in fact, the ports 46, 47 and 48 provided to the hydraulic piston 62 simultaneously move. The pilot spool 49 stops at a position where the pilot pressure applied to the pilot spool 49 and the spring force of the spring 49A are balanced with each other. When the hydraulic piston 62 reaches this stop position, the pilot spool 49 is at a center position to block the main pump pressure oil, so that the hydraulic piston 62 is held to maintain the opening degree of the poppet valve 21. Under these conditions, a desired amount of exhaust gas passes through the poppet valve 21.

When the pilot spool 49 is supplied with a pilot pressure oil smaller than the spring force of the spring 49A, the pilot spool 49 is returned rightward in the figure with the spring force. Thus, while the first internal passage 101 is blocked, the second internal passage 102 and the third internal passage 103 are brought into communication with each other via the ports 47 and 48, so that the pressure oil in the cylinder pressure oil chamber 61 is drained. With the spring force of another spring 62A, the hydraulic piston 62 is returned following the pilot spool 49.

The stop position of the pilot spool 49 is a position where the pilot pressure applied to the pilot spool 49 is balanced with the spring force of the spring 49A. The stop position corresponds to the center position of the pilot spool 49, at which supply of the pressure oil is blocked and the opening degree of the poppet valve 21 is maintained at one corresponding to the pilot pressure, so that a desired amount of exhaust gas passes through the poppet valve 21.

A fourth internal passage (an internal branched passage for generating pilot pressure) 104 is branched from the first internal passage 101. The fourth internal passage 104 is in communication with a fifth internal passage 105 in the EPC valve 52 that supplies pilot pressure oil to the hydraulic servo drive device 40. The fifth internal passage 105 is provided with a filter 105A. An end of the fifth internal passage 105 is in communication with a pressure oil inlet port 54 of a decompression valve 53 that constitutes the EPC valve 52 A sixth internal passage 106 is in communication with a pilot pressure outlet port 55 provided to the decompression valve 53. The sixth internal passage 106 is provided with a filter 106A.

The sixth internal passage 106 is also in communication with a seventh internal passage 107 of the EGR valve device 20. The seventh internal passage 107 is also in communication with a pressure oil chamber provided in the piston 45 so that the pilot spool 49 is moved by supplying pilot pressure oil to the pressure oil chamber. As described above, in the EPC valve 52, the pump pressure oil is decompressed as a source oil to make pilot pressure oil.

A drain outlet port 56 provided to the decompression valve 53 is in communication with an eighth internal passage 108. The eighth internal passage 108 is also in communication with a ninth internal passage 109 of the EGR valve device 20, the ninth internal passage 109 having an end connected to the second internal passage 102 for draining Thus, after being returned to the decompression valve 53 when the pilot spool 49 is moved to the return-side, the pilot pressure oil is returned from the drain port 43 of the EGR valve device 20 to the oil pan 80 through the drain path 95.

In the EGR valve device 20, a tenth internal passage (an internal branched passage for pump pressure oil) 110 is branched from the first internal passage 101. An end of the tenth internal passage 110 is in communication with the output port 22 from which the pump pressure oil is discharged. Specifically, the main pump pressure oil passes through the first internal passage 101 and the tenth internal passage 110, and is discharged from the output port 22 to be supplied to the hydraulic servo drive device 30 for the variable geometry turbocharger 10 through the driving pressure path 93.

Likewise, in the EGR valve device 20, an eleventh internal passage (an internal branched passage for generating pilot pressure) 111 is branched from the tenth internal passage 110. The eleventh internal passage 111 is in communication with a twelfth internal passage 112 in the EPC valve 51 that supplies pilot pressure oil to the hydraulic servo drive device 30. The twelfth internal passage 112 is provided with a filter 112A. An end of the twelfth internal passage 112 is in communication with a pressure oil inlet port 58 of a decompression valve 57 that constitutes the EPC valve 51. A thirteenth internal passage 113 is in communication with a pilot pressure outlet port 59 provided to the decompression valve 57. The thirteenth internal passage 113 is provided with a filter 113A.

The thirteenth internal passage 113 is in communication with a fourteenth internal passage 114 of the EGR valve device 20. The fourteenth internal passage 114 is also in communication with the output port 23 from which the pilot pressure oil is discharged. Specifically, the pilot pressure oil made by decompressing the pump pressure oil through the EPC valve 51 passes through the fourteenth internal passage 114 of the EGR valve device 20, and is discharged from the output port 23 to be supplied to the hydraulic servo drive device 30 for the variable geometry turbocharger 10 through the pilot pressure path 94.

A drain outlet port 60 provided to the decompression valve 57 is in communication with an fifteenth internal passage 115 that is in communication with a sixteenth internal passage 116 of the EGR valve device 20. The sixteenth internal passage 116 is in communication with the ninth internal passage 109, so that after being returned to the decompression valve 57 when the pilot spool 63 of the hydraulic servo drive device 30 is moved to the return-side, the pilot pressure oil is likewise returned from the drain port 43 of the EGR valve device 20 to the oil pan 80 through the drain path 95.

A hydraulic circuit of the hydraulic servo drive device 30 will be described in detail below.

Pump pressure oil is supplied to the pump port 31 of the hydraulic servo drive device 30 from the EGR valve device 20 through the driving pressure path 93. In the hydraulic servo drive device 30, the pump port 31 is in communication with a pressure oil inlet port 65 of a piston 64, which constitutes the hydraulic servo drive device 30, through a seventeenth internal passage 117. The seventeenth internal passage 117 is provided with a filter 117A.

A drain outlet port 66 of the piston 64 is in communication with a drain port 33 of the hydraulic servo drive device 30 via an eighteenth internal passage 118. A first pressure oil inlet/outlet port 67 of the piston 64 is in communication with a bottom-side cylinder pressure oil chamber 34 of the hydraulic servo drive device 30 via a nineteenth internal passage 119. Likewise, a second pressure oil inlet/outlet port 68 of the piston 64 is in communication with a top-side cylinder pressure oil chamber 35 via a twentieth internal passage 120.

The pilot port 32 of the hydraulic servo drive device 30 is in communication with a pilot pressure oil chamber in the piston 64 via a twenty-first internal passage 121. The twenty-first internal passage 121 is provided with a filter 121A.

The pilot spool 63 inside the piston 64 is driven with the pilot pressure oil from the EPC valve 51. The pilot spool 63 is provided with a position sensor 63B. Based on a position detection signal fed back from the position sensor 63B to a controller (not shown), the position of the pilot spool 63 is servo-controlled.

In the hydraulic servo drive device 30, when the pilot spool 63 is moved rightward in the figure with a pilot pressure larger than the spring force of a spring 63A, the 17th internal passage 117 and the twentieth internal passage 120 are in communication with each other via the ports 65 and 68 to supply the pump pressure oil to the top-side cylinder pressure oil chamber 35.

When the pressure oil is supplied to the top-side cylinder pressure oil chamber 35, a hydraulic piston 36 is moved to drive a lever 13 of the opening degree adjustment mechanism of the variable geometry turbocharger 10, which is connected to the hydraulic piston 36, to increase the opening degree of the nozzle. In contrast, the bottom-side cylinder pressure oil chamber 34 is brought into communication with the drain port 33 via the nineteenth internal passage 119, the ports 66 and 67, and the eighteenth internal passage 118, so that the pump pressure oil, the amount of which corresponds to how much the hydraulic piston 36 is moved toward the bottom (corresponds to the pump pressure oil flowing into the top-side cylinder pressure oil chamber 35), is drained.

The hydraulic piston 36 is also configured to move following the pilot spool 63 and, in fact, the ports 65, 66, 67 and 68 provided to the hydraulic piston 36 simultaneously move. Thus, after the pilot spool 63 stops at a position where the pilot spool 63 is balanced with the spring 63A, when the hydraulic piston 36 reaches this stop position, the pilot spool 63 is at a center position to block the main pump pressure oil, so that the hydraulic piston 36 is held to maintain the opening degree of the nozzle.

When the pilot spool 63 is supplied with a pilot pressure oil smaller than the spring force of the spring 63A, the pilot spool 63 is returned leftward in the figure with the spring force. In this manner, the stream of the pump pressure oil is switched, so that the pump pressure oil is supplied to the bottom-side cylinder pressure oil chamber 34 through the seventeenth internal passage 117, the ports 65 and 67, and the nineteenth internal passage 119 and thus the hydraulic piston 36 is returned rightward in the figure following the pilot spool 63. Simultaneously, the pump pressure oil having flowed into the top-side cylinder pressure oil chamber 35 is drained from the drain port 33 through the twentieth internal passage 120, the ports 66 and 68, and the eighteenth internal passage 118. As a result, the lever 13 of the opening degree adjustment mechanism is driven in the direction reverse to the above to close the nozzle.

When the pilot spool 63 and the hydraulic piston 36 are returned to the position where the pilot pressure is balanced with the spring force of the spring 63A, the pilot spool 63 is likewise at the center position, so that supply of the pump pressure oil is blocked and thus the nozzle opening degree is maintained at one for closing.

In the engine 1 according to the above exemplary embodiment, the pressure oil supply path 90 for supplying the main pump pressure oil is branched in the EGR valve device 20 into a path for the hydraulic servo drive devices 30 and a path for the hydraulic servo drive devices 40. Additionally, the EPC valve 51 that generates pilot pressure for the hydraulic servo drive devices 30 and the EPC valve 52 that generates pilot pressure for the hydraulic servo drive devices 40 are both attached to the EGR valve device 20. With the above arrangement, since the EGR valve device 20 can substitute for a conventional hydraulic manifold block for distributing pump pressure oil and pilot pressure oil, such a hydraulic manifold block is unnecessary.

Thus, the number of heavy components attached to the cylinder head 2 can be reduced, so that vibration or rolling in the engine 1 promptly subsides and thus stability can be improved. Additionally, unlike a conventional arrangement, the above arrangement does not require attaching nipples and piping for the hydraulic manifold block, so that assembly efficiency can also be improved.

It should be appreciated that the scope of the invention is not limited to the above exemplary embodiment but modifications and improvements that are compatible with an object of the invention are included within the scope of the invention.

For instance, although the hydraulic servo drive device 40 uses the piston 45 provided with the pilot spool 49 to be structured as a 3-port 3-position piston and the hydraulic servo drive device 30 uses the piston 64 provided with the pilot spool 63 to be structured as a 4-port 3-position piston in the exemplary embodiment, both the hydraulic servo drive devices 30 and 40 may use 3-port 3-position pistons or 4-port 3-position pistons. In other words, what type of hydraulic servo drive device should be used may be determined as desired in implementation of the invention.

Although the EPC valves 51 and 52 are both attached to the EGR valve device 20 in the exemplary embodiment, the EPC valves 51 and 52 may be attached to the variable geometry turbocharger 10 without departing the scope of the invention. However, in order to prevent thermal influence on the EPC valves 51 and 52, the EPC valves 51 and 52 are preferably attached to the EGR valve device 20, which is unlikely to be heated to a high temperature, rather than to the variable geometry turbocharger 10, which can be heated to a high temperature.

Although the hydraulic servo drive device 40 for the EGR valve device 20 is installed inside the EGR valve device 20 in the exemplary embodiment, the hydraulic servo drive device 40 may be attached to the exterior of the EGR valve device 20 in the same manner as the hydraulic servo drive device 30 is attached to the exterior of the variable geometry turbocharger 10.

Although the drain port 33 of the hydraulic servo drive device 30 is in communication with the variable geometry turbocharger 10 via the drain passage 76 so that the drain pressure oil from the drain port 33 is drained via the variable geometry turbocharger in the exemplary embodiment, for instance, the drain port 33 and the drain path 95 (FIG. 1) may be in communication with each other to drain the drain pressure oil.

Although the hydraulic actuators according to the invention are exemplified by the hydraulic servo drive devices 30 and 40 in the exemplary embodiment, a non-servo-controlled hydraulic actuator configured to move a pilot spool without using servo control may be employed.

Although pilot pressure is generated in the EPC valves 51 and 52 for the variable geometry turbocharger 10 and the EGR valve device 20 in the exemplary embodiment, the pilot pressure may be generated in, for instance, an EPC valve for driving a variable displacement hydraulic pump or an EPC valve for a variable valve timing device configured to vary a valve opening and closing timing.

A variable displacement hydraulic pump uses an EPC valve to generate pilot pressure for a hydraulic actuator that drives a swash plate or the like. A variable valve timing device uses an EPC valve to generate pilot pressure for a hydraulic actuator, for instance, when the rotation of the crankshaft in an engine is transmitted to the camshaft via a planetary speed reducer and a part of a planetary gear mechanism in the planetary speed reducer is driven by the hydraulic actuator to vary a phase difference between the rotation of the crankshaft and the rotation of the camshaft.

Although the internal passage 111 provided in the EGR valve device 20 is branched from the internal passage 110 to be in communication with the EPC valve 51 side as shown in FIG. 4 in the exemplary embodiment, the internal passage 111 may be branched directly from the internal passage 101.

Although the two EPC valves 51 and 52 are provided to the EGR valve device 20 in the exemplary embodiment, three or more EPC valves may be attached to one device without departing the scope of the invention.

The invention claimed is:

1. An engine comprising:
    a variable geometry turbocharger;
    an EGR valve device;
    first and second hydraulic actuators that actuate the variable geometry turbocharger and the EGR valve device, respectively; and
    first and second control valves that generate pilot pressure for the first and second hydraulic actuators, respectively, wherein
    the EGR valve device is attached with both the first and second control valves and is located at a position different from an exhaust manifold side of the engine.

2. The engine according to claim 1, wherein
the EGR valve device comprises:
an internal passage for pump pressure oil through which pump pressure oil is supplied to the second hydraulic actuator;
an internal branched passage for pump pressure oil that is branched from the internal passage for pump pressure oil to supply the pump pressure oil to the first hydraulic actuator; and
a pair of internal branched passages for generating pilot pressure that is branched from the internal passage for pump pressure oil to supply the pump pressure oil to the first and second control valves.

3. The engine according to claim 1, wherein
the first hydraulic actuator is provided with a drain port for the pump pressure oil, and
the drain port is in communication with the variable geometry turbocharger.

4. The engine according to claim 1, wherein
engine lubricating oil is used as the pressure oil supplied to the first and second hydraulic actuators.

5. The engine according to claim 4, further comprising:
an engine lubrication path that lubricates the engine;
a pressure oil supply path that is branched from the engine lubrication path to supply the engine lubricating oil to the first and second hydraulic actuators;
a hydraulic pump that is provided in the engine lubrication path to make the engine lubricating oil flow through the engine lubrication path; and
a boost pump that is provided in the pressure oil supply path to boost a pressure of the engine lubricating oil from the hydraulic pump before the engine lubricating oil flows through the pressure oil supply path.

* * * * *